Feb. 7, 1967   E. GÖTZ   3,303,332
PROGRAM CONTROL SYSTEM
Filed April 5, 1963
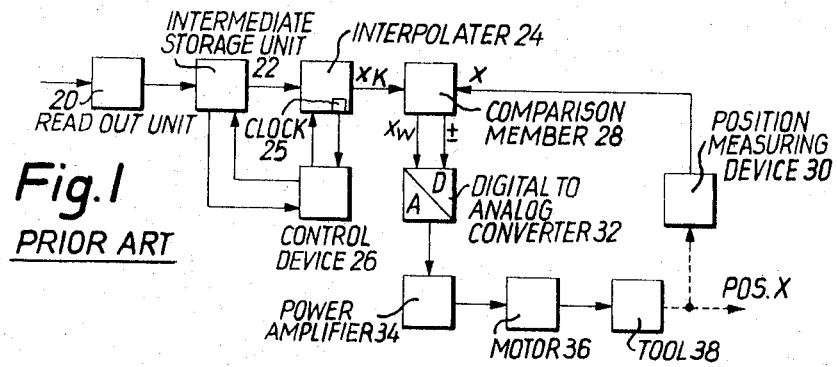
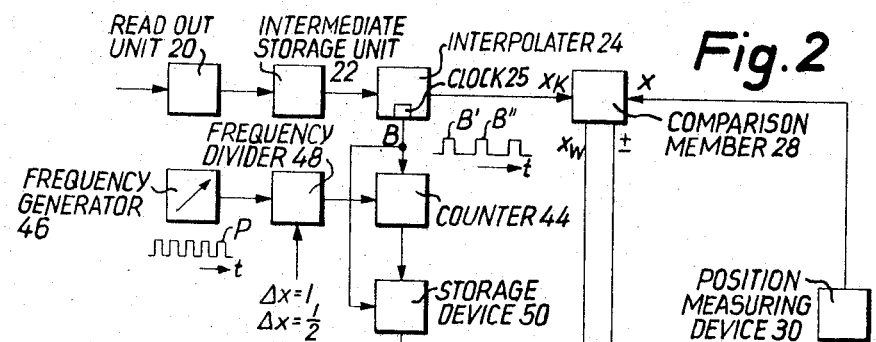
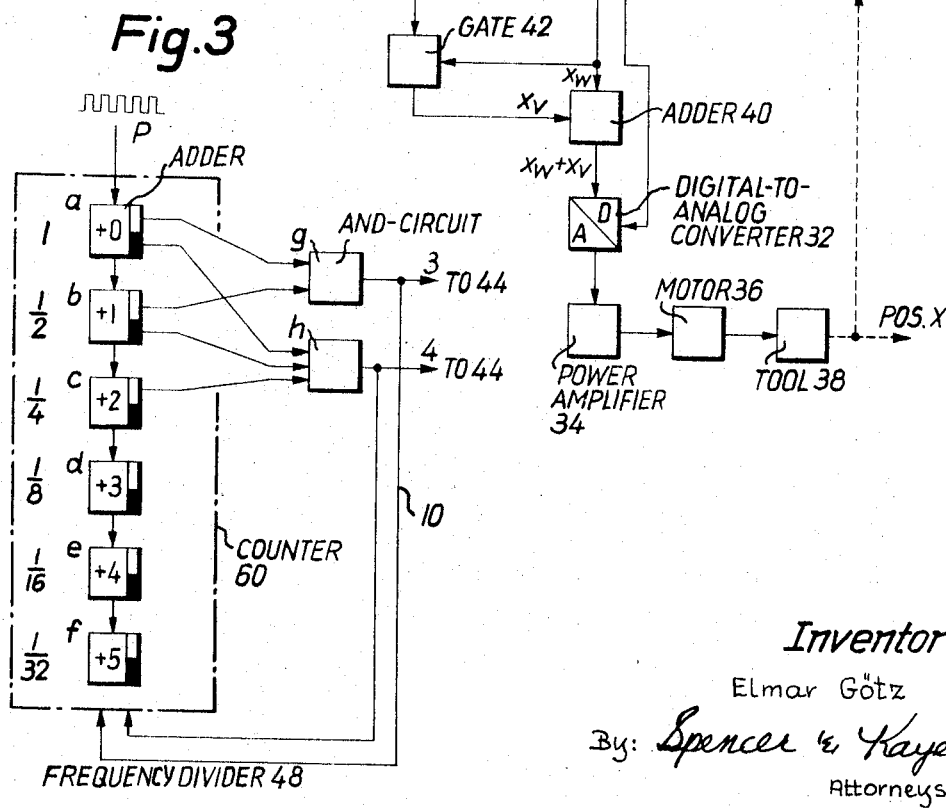
Inventor:
Elmar Götz
By: Spencer & Kaye
Attorneys

United States Patent Office 3,303,332
Patented Feb. 7, 1967

3,303,332
PROGRAM CONTROL SYSTEM
Elmar Götz, Frankfurt am Main-Gravenbruch, Germany, assignor to Licentia Patent-Verwaltungs-G.m.b.H., Frankfurt, Germany
Filed Apr. 5, 1963, Ser. No. 270,953
Claims priority, application Germany, Apr. 5, 1962, L 41,662
10 Claims. (Cl. 235—151.11)

The present invention relates to a program control system, particularly to an arrangement suitable for controlling machine tools. Such arrangements have control systems which control the position of the work tool relative to the work piece, or vice versa.

A system of the above type may incorporate digital interpolaters for carrying out linear and circular interpolation, which interpolaters put out, in timed relationship, the desired or so-called nominal positions which the tool is to occupy during its movement relative to the work piece, it being assumed hereinafter that the work piece is carried by a stationary component and that the work tool is carried by a component which moves relative to the first-mentioned component carrying the work piece, although in practice the work piece may be movable and the work tool stationary. The speed or rate at which the tool is to move relative to the work piece is given by a program. Such a system is shown, in block form, in FIGURE 1, and comprises a read out unit 20 for producing signals in response to a program fed into the unit. In practice, the program may be stored on a strip of punched tape, in which case the read out unit 20 is a punched tape reader able to sense the perforations on the tape for producing signals corresponding to the positioning of these perforations. The output of unit 20 is applied to an intermediate storage unit 22 in which the individual commands are stored in groups or so-called "sentences," and the output of the unit 22, in turn, is applied to an interpolator 24, so that the latter receives the program values of the particular path or curve which the tool 38 is to follow. The interpolator 24 calculates the individual nominal positional values intermediate the applied values and puts out the calculated values at a certain beat or clock pulse frequency generated by a clock 25. The interpolator 24 is controlled by a control device 26, which itself is controlled by the clock pulses at which the interpolator operates. The thus computed nominal positional values are applied to one input of a digital comparison member 28 whose other input is connected to the output of a position measuring device 30 which measures the physical position of the tool whose movement is controlled by the system. The device 30 may, for example, be a scanner, e.g., a photoelectric scanner, which is carried by the movable component and scans a digital code scale carried by the stationary component, or vice versa. The output of the comparison member 28 thus represents any difference between the actual position of the tool and the nominal position, as calculated by the interpolator 24. This difference output is applied to a digital-to-analog converter 32 whose output, in turn, is applied, via a power amplifier 34, to a positioning motor 36. The latter is connected so as to move the work tool 38 in the direction X, this being the direction considered here for purposes of explanation.

The digital-to-analog converter 32 will produce a voltage, of a magnitude and polarity corresponding to the amplitude and algebraic sign of the difference output produced by the comparison member 28, so that the motor 36 can be made to turn in either direction. In this way, the work tool can be made to occupy any point along the direction X.

If the motor 36 is to operate at high speed, the output voltage of the digital-to-analog converter 32 must be correspondingly large. The power amplifier 34 will thus receive a large input signal which results in a large input signal being applied to the motor 36. Therefore, the larger the deviation $X_W$ between the actual and nominal values, the faster will the motor run, which, however, has the drawback that the accuracy with which the control and position setting is effected is decreased. This is an inherent feature of the above-described system, inasmuch as the motor receives a voltage which is sufficiently large to make the motor run fast only when the deviation $X_W$ is large. Yet this defeats the purpose of the control system whose primary mission is to make the actual position of the tool coincide as closely as possible with the nominal position.

It is, therefore, an object of the present invention to provide a control system which overcomes the above disadvantage, and, with this object in view, the present invention relates to a numerical position control system incorporating an interpolater and a positioning control circuit, which control system is characterized by the following features:

(1) There is a counter which is controlled by the clock pulses in response to which the interpolater operates.

(2) The counter counts down between the clock pulses, from a maximum value.

(3) The lowest value which is counted during an interval between clock pulses is added, as a quantity which controls the speed at which the motor moves the tool, to the difference between the actual and nominal values.

Additional objects and advantages of the present invention will become apparent upon consideration of the following description when taken in conjunction with the accompanying drawings in which:

FIGURE 1 is, as described above, a block diagram of a control system according to the prior art.

FIGURE 2 is a block diagram of an improved control system according to the present invention.

FIGURE 3 is a schematic diagram of a frequency divider which may be used in the control system shown in FIGURE 2.

Referring once again to the drawings and to FIGURE 2 thereof in particular, the same shows the system according to the present invention as comprising the read out unit 20, the intermediate storage unit 22, the interpolater 24, clock 25, the comparison member 28, the position measuring device 30, the digital-to-analog converter 32, the power amplifier 34, the positioning motor 36, and the work tool 38, these components being the same as those described above in connection with FIGURE 1. The system of FIGURE 2 does not, however, include the control device 26, there being, in its place, the components to be described below. These components include a digital adder 40 interposed between the comparison member 28 and the digital-to-analog converter 32, this adder having applied to one of its inputs the value $X_W$, in digital form, representing the magnitude of the difference between the actual and nominal positions of the tool. The other input of the adder has applied to it a digital value $X_V$. According to the present invention, this value is small when the positioning motor 36 operates at low speed and is large when the motor operates at high speed. If while the motor is operating at high speed, a large value $X_V$ is added to the difference $X_W$, there will appear at the output of the adder the sum of $X_W$ and $X_V$, as a result of which the input applied to the digital-to-analog converter 32, and hence its output, becomes larger yet. Consequently, the motor will operate very rapidly.

By introducing the value $X_V$, which serves as a speed control magnitude, it is now possible, if the value $X_V$ is sufficiently high, for the difference $X_W$ to be equal to zero while a voltage is nevertheless applied to the converter 32 as a result of which the motor 36 is made to operate. If the value $X_v$ is made to be precisely so large as to produce the desired motor speed, then the motor will operate with the difference $X_w$ being equal to zero.

In practice, the position difference $X_w$ will not be made equal to zero inasmuch as the algebraic sign $+$ or $-$ will be required for the controlling of the position. For this reason, the difference $X_w$ is made no smaller than about two units. It is, therefore, this value at least which always appears at the output of the comparison member 28. In order that the algebraic sign is fixed, there will appear at the algebraic sign output of the comparison member always the value $+$ or $-$. The amount above $X_w=2$ units is now always produced by the value $X_v$ additionally applied to the adder 40.

Let it now be assumed, for example, that the movable component is to travel at a speed of 1 meter per minute, and that this requires, for instance, 20 units to be applied to the input of the digital-to-analog converter 32 so that the amplifier will then have a voltage applied to it which causes the motor to run at a rate of 20 units per minute. Eighteen of these units are supplied by the value $X_v$ applied to the adder and 2 units are delivered by the difference $X_w$. In order to determine the direction in which the motor is to run, the algebraic sign of the difference $X_w$, whose magnitude is 2 units, is applied to the converter. If this value $X_w$ were equal to 20 units, the difference $X_w$ would be equal to 0. This would result in an ambiguous algebraic sign at the output of the comparison member. It is true that the positioning motor would then receive the command to run at a high speed, but it would not receive any command telling it in which direction to run. The limit for $X_v$ is thus the maximum magnitude (20 units) for controlling the motor minus 2 units, with 2 units being the minimum position difference $X_w$. In this way, no difficulties will arise in determining the algebraic sign of the value put out by the comparison member 28.

The output of comparison member 28 yielding the difference $X_w$ is connected to the control input of a gate 42 through which the value $X_v$ is applied to the adder 40. This gate is closed the moment the difference $X_w$ becomes equal to zero. This will cause the speed of the motor to drop immediately to zero, inasmuch as the value $X_v$ is missing. This, however, will immediately bring about a new position difference because the motor will, due to the closing of the gate, run slower. Consequently, an algebraic sign will appear at the output of the comparison member. It will be seen, therefore, that the gate 42 protects the system if the value $X_v$ applied through it has a magnitude of, for example, 21 units, even though only 20 units are required. In that case, the positioning motor would be switched over, which is in any case prevented by the fact that the value $X_v$ is gate controlled. Thus, if the position difference $X_w$ becomes equal to zero, the gate is in any case immediately closed. This prevents oscillations or so-called hunting of the motor. The value $X_v$ must in any case be smaller than the number of units needed for controlling the positioning motor. In practice, the value of $X_v$ is made approximately five units smaller than the number of units needed, so as to be able to process smaller speed changes during operation, which do not as yet represent any faulty operation, without the gate being closed.

Thanks to the fact that the value $X_v$ is added to the position difference $X_w$, the latter does not have to be made larger in order to control the motor, inasmuch as the value $X_v$ is utilized for controlling the motor. This produces the desired exact control.

The value $X_v$ is obtained by means of a counter 44. The system further comprises a frequency generator 46 which may be a manually adjustable one. The frequency generator 46 applies an auxiliary frequency to the counter 44, as indicated by the pulse train P. The purpose of the frequency divider 48 which is interposed between the frequency generator 46 and the counter 44 will be described below. The output of the counter 44 is connected to a storage device 50. Both the counter 44 and the storage device 50 are pulsed by the clock pulses B coming from the clock 25 of the interpolater 24. Upon the occurrence of a clock pulse from the clock 25, the interpolater 24 will also apply a newly calculated nominal value $X_K$ to the comparison member 28, the interpolater being of a type which produces such individual nominal values per unit time. The faster the interpolater puts out these individual values, the faster will the tool traverse the path which it is supposed to cover. Thus, upon the occurrence of a clock pulse B', a corresponding nominal value is put out as in individual nominal value. If the clock pulses appear at a fast rate, the system will operate correspondingly fast; if the pulses appear more slowly, the system as a whole will operate more slowly.

In the arrangement of FIGURE 1, the clock pulses produced by the clock 25 are utilized solely for the operation of the interpolater 24. According to the present invention, however, as shown in FIGURE 2, the clock pulses are also put out to work to assist in the operation of the control system as a whole. As already stated above, the clock pulses from the clock 25 are applied to the counter 44 and the storage device 50. The clock pulses B have the following effect: the counter 44 is so arranged that, beginning from its starting position, it counts from a maximum value down to lower values, this always occurring during the interval between two clock pulses B. The counter 44 is a binary counter and in its starting position, for example clock pulse B' shown in FIGURE 2, is set to its maximum value, e.g., the binary value LLLL (the symbol L representing the binary "one"). Upon the termination of clock pulse B', the counter 44 commences to count in response to the control pulses P of the auxiliary frequency coming from generator 46. The counter continues to count down until the appearance of pulse B''. If the rate at which the clock pulses B', B'', are generated is low, the counter may count down as far as 0. As soon as the pulse B'' appears, the counter applies whatever value it has counted down to, to the storage device 50. The counter is then reset to its maximum value. Upon the disappearance of pulse B'', the counter again starts to count down. The lowest value to which the counter has counted down is thus taken up by the storage device 50 and this value is the value $X_v$ which is utilized for purposes of speed control, as explained above.

If the repetition rate of the clock pulses B is very slow, the output of the storage device 50 will be $X_v=0$. Consequently, only the value 0 is added to the difference $X_w$, so that only the latter value is effective to control the motor. Inasmuch as the difference $X_w$ should not become large, the motor will run slowly. This is what is desired because the clock pulses B follow each other at a slow rate. The movable component of the machine will, under these circumstances, move slowly. In this way, no speed control nominal value $X_v$ at all is added, which is as it should be.

Let it now be assumed that the pulse repetition rate of pulse train B coming from the clock 25 is equal to the pulse repetition rate of the pulse train P coming from the generator 46. The counter 44 would then receive precisely one pulse from generator 46 and then be immediately reset. This, however, means that the counter 44 is always at its maximum value. Consequently, the storage device 50 will always contain the maximum value. This maximum value is therefore applied, via gate 42, to the adder 40, so that the motor will be driven at maximum speed. This, of course, is what is desired when the interpolator 24 puts out the nominal values $X_K$ at a high rate.

The addition $X_W + X_V$ is obtained by the auxiliary frequency P of the frequency generator 46. The auxiliary frequency P is freely selectable; in any case, it must be greater than or equal to the frequency of the pulse train B generated by the interpolator 24.

As explained above, the counter 44, which is under the influence of the pulses coming from the generator 46, counts down from its maximum value. The higher the auxiliary frequency P, the lower will be the value which the counter 44 can reach per unit time. If, for example, there is a time interval of 1 second between pulses B' and B'', the higher the frequency P, the lower will be the value reached by the counter, i.e., the higher the frequency P, the smaller will be the value $X_V$ put out by the storage device 50. Thus, by adjusting the auxiliary frequency P, it is possible to preselect how large the speed addition will be. The value put out by the storage device 50 is proportional to the pulse repetition frequency B coming from the clock 25.

Assuming that the maximum value of counter 44 is LLLL, it will, upon the occurrence of the first pulse P from the frequency generator 46, count down to LLLO. At the second pulse P the counter 44 will be at LLOL, at the third pulse at LLOO, at the fourth pulse LOLL, and so on. At whatever instant a pulse B appears, the condition of the counter at that instant will be applied to the storage device 50, whereupon the counter is reset to LLLL. Naturally, the maximum value can be initially selected to be greater than LLLL. If the pulse repetition frequency of B remains the same, the output of storage device 50 would remain the same. If the auxiliary frequency P of signal generator 46 is increased, the counter 44 will, during the same unit time, reach a lower value than before. Consequently, the value $X_V$ will no longer become as large. If, however, the auxiliary frequency P of signal generator 46 is decreased, the value $X_V$ is increased. The value $X_V$ appearing at the output of the storage device 50 remains until the occurrence of the next pulse B.

The incremental values Δr put out by the interpolator do not remain constant. The value Δr can, for example, vary by a ratio of 1:2, e.g., it can be between 5 and 10μ meters. The value Δr is obtained by division. Inasmuch as the value Δr is not constant, the value Δx for a given rectilinear path of given slope will not be constant. According to a further feature of the present invention, the auxiliary frequency of the signal generator 46 is modified by means of the above-mentioned frequency divider 48. If the value Δx=1, i.e., if the value is so large that Δx times the frequency B is equal to the desired speed, then the divider 48 has no effect. If Δx=½, then the feed speed, i.e., the speed at which the movable component is advanced along the prescribed path is only half as great, provided the frequency B remains the same. Care must then be taken that there is only half as large a speed addition. In this case the auxiliary frequency P is divided in the ratio 1:2, for which purpose the frequency divider 48 is provided.

Assuming the frequency generator 46 delivers the auxiliary frequency 2 and Δx=1, then the frequency divider 48 divides the auxiliary frequency P by the ratio 1:2. There will thus appear, at the output of the frequency divider, the value 1 times Δx. If Δx=½, it is necessary to count with twice the auxiliary frequency. If the auxiliary frequency is doubled, the counter 44 will count down to twice as small a value as was the case when Δx=1, the clock pulse frequency B remaining the same. When Δx=½, the feed speed is half as large. The counter 44 must therefore come down to a low value which is half as large than when Δx was equal to 1. Similarly, the value $X_V$ at the output of the storage device 50 is half as large, whereby the speed addition is decreased by half.

The frequency divider can also be fashioned as binary counter. This counter, too, is so arranged as to count backwards. If a frequency division is to be carried out, the counter counts, under the influence of the pulses P, to the desired dividing ratio, for example 1:4, from 0 to 4, thereafter puts out a signal, whereupon the counter is reset to 0.

FIGURE 3 is a schematic diagram of the frequency divider 48 arranged to include a counter 60 capable of carrying out the above-described operation. The counter, which is disclosed and claimed in my co-pending application Ser. No. 250,341, filed January 9th, 1963, comprises a plurality of counter stages a, b, c, d, e, f, each of which is an adder having an affirmed output, indicated symbolically by the white rectangle, and a negated output, indicated symbolically by the black rectangle. Upon operation, there will appear at stage a the frequency 1, at stage b the frequency ½, at stage c the frequency ¼, at stage d the frequency ⅛, at stage e the frequency ⅟₁₆, and at stage f the frequency ⅟₃₂. The pulses P are counted as binary numbers. The outputs of the adders have AND-circuits connected to them, two of which are indicated at g and h, respectively. The AND-circuit g responds, for example, to the number 3, while the AND-circuit h responds to the number 4. Further AND-circuits (not shown) may be provided. The signal appearing at the output of AND-circuit g resets the counter 60 to 0, as indicated schematically by line 10. Thus, the counter 60 counts, for example, from 1 to 3, whereupon a pulse appears at the output of AND-circuit g which, via line 10 resets the counter to 0. A pulse would appear at the output of AND-circuit h at the number 4, which resets the counter to 0. The inputs of AND-circuit h are at 4=L, and are connected to the negated outputs of stages a and b and to the affirmed output of stage c. There may be further AND-circuits which are so arranged as to respond to any desired number. The output pulses of the AND-circuits are applied to the counter 44 (FIGURE 2).

The above-described frequency divider may be used to obtain any desired frequency division. It is, of course, within the scope of the present invention to use a system as shown in FIGURE 2 which uses a frequency divider other than that illustrated in FIGURE 3.

It will be understood that the above description of the present invention is susceptible to various modifications, changes, and adaptations, and the same are intended to be comprehended within the meaning and range of equivalents of the appended claims.

What is claimed is:

1. In an arrangement for controlling the position which a movable part occupies relative to a stationary part, the combination which comprises:
   (a) means for supplying data representing nominal positions of said movable part;
   (b) an interpolator connected to the output of said means (a) for calculating intermediate values;
   (c) a clock associated with said interpolator for generating a train of clock pulses thereby to operate said interpolator;
   (d) means for measuring the actual position of said movable part;
   (e) comparison means connected to the output of said interpolator and to the output of said measuring means for producing a value representing the difference between the actual and nominal positions of said movable part;
   (f) a counter connected to said clock and being controlled by the train of clock pulses produced thereby for counting down from a maximum value;
   (g) means for obtaining the lowest value to which said counter counts down during the time interval between successive clock pulses;
   (h) means for adding the output obtained from said comparison means and the output of said means recited in paragraph (g); and
   (i) moving means connected and responsive to the output of said adding means for moving said movable part.

2. The combination defined in claim 1 wherein said adding means comprise an adder having a first input connected to the ouput of said comparison means and a second input connected to the output of said means recited in paragraph (g).

3. The combination defined in claim 2 wherein said means recited in paragraph (g) comprise a storage device having an input connected to the output of said counter.

4. The combination defined in claim 1 wherein said means recited in paragraph (g) comprise a storage device having an input connected to the output of said counter, and wherein said adding means comprise an adder having a first input connected to the output of said comparison means and a second input connected to the output of said storage device.

5. The combination defined in claim 4, further comprising a gate interposed between the output of said storage device and said second input of said adder, said gate having a control input connected to said output of said comparison means.

6. The combination defined in claim 1 wherein said counter is connected to a frequency generator and counts the number of pulses produced thereby.

7. The combination defined in claim 6 wherein said frequency generator is adjustable.

8. The combination defined in claim 6, further comprising a frequency divider interposed between said frequency generator and said counter.

9. The combination defined in claim 8 wherein said frequency divider comprises a binary counter incorporating a series of adders and logic circuit means connected to said adders for producing pulses in dependence on the desired frequency division.

10. A control system as defined in claim 1 wherein said parts are a component for carrying a work tool and a component for carrying a work piece, said components being part of a machine tool.

References Cited by the Examiner

UNITED STATES PATENTS

| | | |
|---|---|---|
| 2,900,586 | 8/1959 | Spencer et al. |
| 3,062,995 | 11/1962 | Raymond et al. |
| 3,128,374 | 4/1964 | Yu Chi Ho et al. __ 235—151.11 |
| 3,148,316 | 9/1964 | Herchenroeder. |
| 3,172,026 | 3/1965 | Schuman _____ 235—151.11 |

MALCOLM A. MORRISON, *Primary Examiner.*

I. KESCHNER, *Assistant Examiner.*